United States Patent
Su et al.

(10) Patent No.: US 12,200,126 B2
(45) Date of Patent: Jan. 14, 2025

(54) METHOD OF DESIGNING OF MULTI-PARTY SYSTEM IN QAP-BASED HOMOMORPHIC ENCRYPTION

(71) Applicant: National Applied Research Laboratories, Hsinchu (TW)

(72) Inventors: Zheng-Yao Su, Hsinchu (TW); Ming-Chung Tsai, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 204 days.

(21) Appl. No.: 18/077,262

(22) Filed: Dec. 8, 2022

(65) Prior Publication Data

US 2023/0188343 A1    Jun. 15, 2023

Related U.S. Application Data

(60) Provisional application No. 63/288,541, filed on Dec. 11, 2021.

(51) Int. Cl.
*H04L 9/30* (2006.01)
*H04L 9/00* (2022.01)

(52) U.S. Cl.
CPC ............ *H04L 9/3066* (2013.01); *H04L 9/008* (2013.01); *H04L 2209/46* (2013.01)

(58) Field of Classification Search
CPC ..... H04L 9/3066; H04L 9/008; H04L 9/3093; H04L 9/085; H04L 2209/46
See application file for complete search history.

(56) References Cited

U.S. PATENT DOCUMENTS

| | | | | |
|---|---|---|---|---|
| 10,116,437 | B1* | 10/2018 | Krendelev | H04L 9/008 |
| 2019/0036678 | A1* | 1/2019 | Ahmed | H04L 9/008 |
| 2020/0136797 | A1* | 4/2020 | Yu | H04L 9/008 |
| 2020/0151356 | A1* | 5/2020 | Rohloff | H04L 9/008 |
| 2021/0319098 | A1* | 10/2021 | Pogorelik | G06N 3/084 |
| 2023/0325529 | A1* | 10/2023 | Sav | G06F 21/6245 726/26 |

\* cited by examiner

*Primary Examiner* — Richard G Keehn
(74) *Attorney, Agent, or Firm* — Amin, Turocy & Watson, LLP

(57) ABSTRACT

A method of designing a multi-party system in quotient algebra partition-based homomorphic encryption (QAPHE), which is based on the framework of quotient algebra partition (QAP) and the computation of homomorphic encryption (HE), wherein the method comprises: increasing single model provider A to multiple ones, wherein the number of the multiple model providers is L and let $A_{1 \leq i \leq L}$ and $L \geq 2$; increasing single data provider B to multiple ones, wherein the number of the multiple data providers is R and let $B_{1 \leq j \leq R}$ and $R \geq 2$; and encoding plaintexts, each of which is of $k_j$ qubits, from all data providers into ciphertexts respectively; aggregating the ciphertexts by a form of tensor product and generating an encoded state for computation; and preparing a model operation to conduct the encrypted computation via an encoded operator and the encoded state in a cloud. The method can improve the security of public-key/semi-public-key system and be applied to a threshold HE or a multi-key HE to solve actual problems.

12 Claims, 3 Drawing Sheets

METHOD OF DESIGNING OF MULTI-PARTY SYSTEM IN QAP-BASED HOMOMORPHIC ENCRYPTION

RELATED APPLICATIONS

The present application claims the priority of U.S. Provisional Patent Application No. 63/288,541 filed on Dec. 11, 2021, the disclosure of which is hereby incorporated by reference herein in its entirety.

BACKGROUND OF THE INVENTION

1. Field of the Invention

The present disclosure generally relates to a method of quotient algebra partition-based homomorphic encryption (QAPHE), particularly, to a method extending the scheme of public-key or the scheme of semi-public-key system in QAPHE to their corresponding models of multi-party homomorphic encryption.

2. Description of the Related Art

Homomorphic Encryption (HE) is deemed to be the most important technology in cryptology and information security that permits users to perform computations on encrypted data without first decrypting it. It highly improves the security of data processing.

Secure Multi-Party Computation (SMPC) is a subfield of cryptology with the goal of creating methods for each party to jointly compute a function over their inputs while keeping those inputs private. In traditional, cryptology is about hiding content, yet SMPC is about hiding partial information of data while computing with the data from multiple sources and producing outputs correctly.

Depending on different situations of security requirement, the known extended schemes of HE, combined with SMPC, have been developed, such as the threshold HE and multi-key HE.

However, the current model of multi-party homomorphic encryption is designed according to the requirements of the traditional unitary model, which has a limited security level.

Therefore, how to extend the scheme of public-key or semi-public-key system in QAPHE to the model of multi-party homomorphic encryption directly by algorithm of QAP and thereby providing a commercial multi-party information security infrastructure becomes an urgent problem to be solved.

SUMMARY OF THE INVENTION

The present inventive concept provides a method of designing a multi-party system in QAP-based homomorphic encryption which may be applied to multi-party QAPHE depending on different situations of security requirement at the same time.

In light of achieving the foregoing desired result, the present inventive concept provides a method of designing a multi-party system in quotient algebra partition-based homomorphic encryption (QAPHE), wherein the method comprises:

S1. increasing a single model provider A to multiple ones, wherein the number of the multiple model providers is L and let $A_{1 \leq i \leq L}$ and $L \geq 2$;

S2. increasing a single data provider B to multiple ones, wherein the number of the multiple data providers is R and let $B_{1 \leq j \leq R}$ and $R \geq 2$; and for the $k_j$-qubit plaintext of each of the data providers, encoding this plaintext into a ciphertext $|\psi_j\rangle$;

S3. aggregating the number R of ciphertexts by a form of tensor product and generating an encoded state $$|\psi_{en}\rangle = \bigotimes_{j=1}^{R} |\psi_j\rangle$$

for computation; and

S4. preparing a model operation to conduct the computation, $U_{en}|\psi_{en}\rangle$, of an encoded operator $U_{en}$ and the encoded state $|\psi_{en}\rangle$ in a cloud.

In an embodiment of the present inventive concept, the multi-party system of public-key scheme designed by the method executes its function by extending a single public-key in QAPHE.

In an embodiment of the present inventive concept, the step of S1 of the method further comprises: choosing a partition $[n_i, k_i, C_i]$ by each of the model providers and one public-key $Key_{pub,i}$ and one private-key are generated by each of the partition.

In an embodiment of the present inventive concept, the public-key $Key_{pub,i}$ is composed of $n_i$-qubit modified encoding and a random error generator.

In an embodiment of the present inventive concept, the step of S2 of the method further comprises: choosing a public-key $Key_{pub,j}$ by each of the data providers and each of the data providers encodes its own $k_j$-qubit plaintext into a ciphertext $|\psi_j\rangle$.

In an embodiment of the present inventive concept, the multi-party system of semi-public-key scheme designed by the method executes its function by extending a single semi-public-key in QAPHE.

In an embodiment of the present inventive concept, the step of S1 of the methods further comprises: generating semi-public-key $Key_{s-pub}$ employed by all the $A_{1 \leq i \leq L}$ together.

In an embodiment of the present inventive concept, the semi-public-key is composed of encoding generators.

In an embodiment of the present inventive concept, the step of S2 of the method further comprises: choosing an encoding $Q_P^{(j)}$ by each of the data providers and each of the data providers encodes its own $k_j$-qubit plaintext into a ciphertext $|\psi_j\rangle$.

In an embodiment of the present inventive concept, $$\sum_{j=1}^{R} k_j \leq k$$

in the step of S2.

In an embodiment of the present inventive concept, after the step of S3, the method further comprises: sending encoded message $En(\zeta_P^{(j)})$ to $A_{\sigma(j)}$ by the data providers, wherein $\sigma(j)$ is a permutation.

In an embodiment of the present inventive concept, the cloud maintains single due to the consideration of parallel computation.

The present inventive concept provides a method of designing of multi-party system in QAP-based homomorphic encryption. This method is able to improve the security of public-key/semi-public-key system; under proper conditions, the common designs of multi-party HE, such as threshold HE or multi-key HE, may be included to be immediately applied to practical scenarios.

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Figure 1:
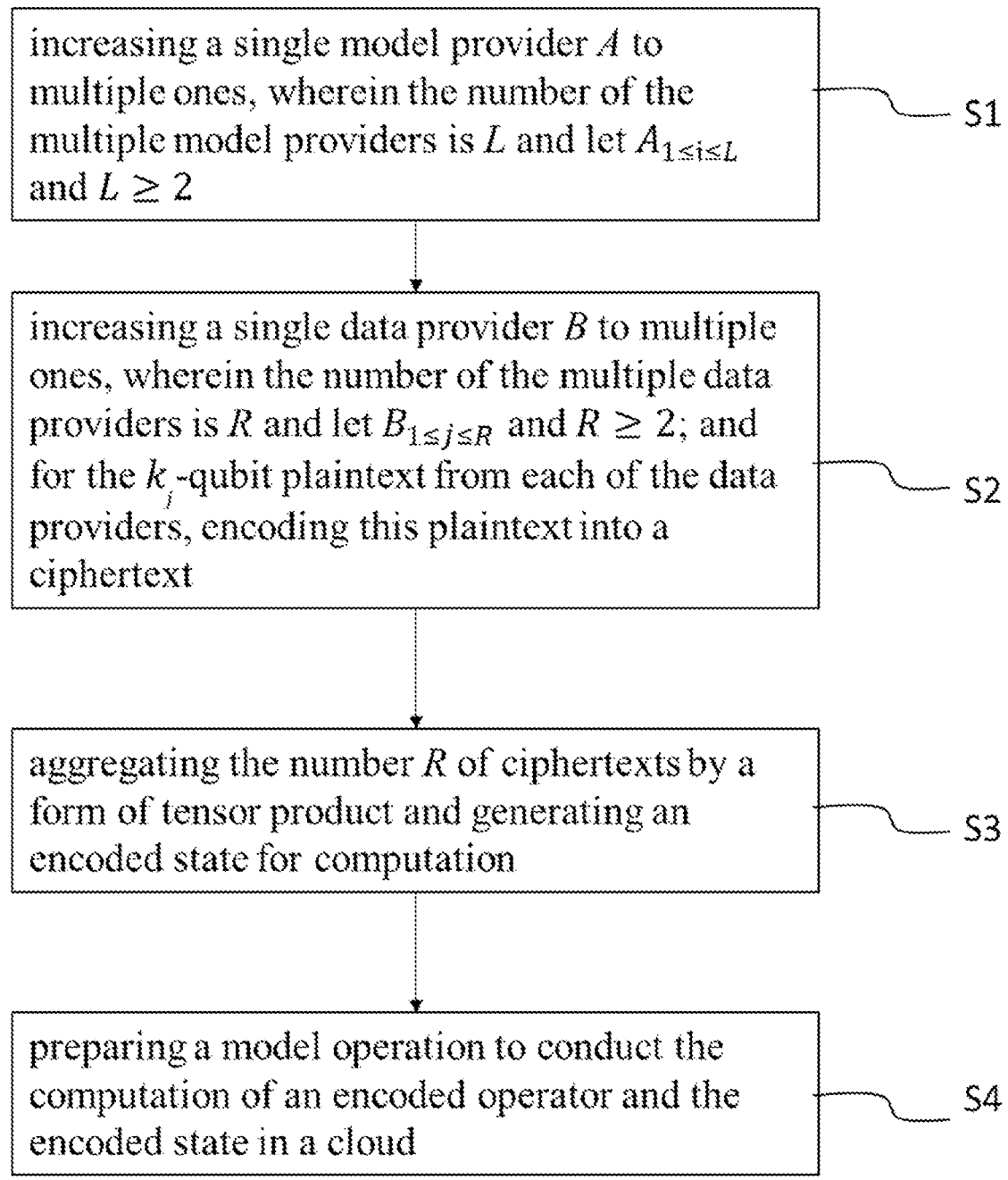
FIG. 1 is a flowchart of an embodiment of the method provided by the present inventive concept.

Please refer to FIG. 1 which is a flowchart of an embodiment of the method provided by the present inventive concept. The present inventive concept provides a method of designing a multi-party system in quotient algebra partition-based homomorphic encryption (QAPHE), which is based on the framework of quotient algebra partition (QAP) and the computation of homomorphic encryption (HE), wherein the method comprises:

S1. increasing a single model provider A to multiple ones, wherein the number of the multiple model providers is L and let $A_{1 \leq i \leq L}$ and $L \geq 2$;

S2. increasing a single data provider B to multiple ones, wherein the number of the multiple data providers is R and let $B_{1 \leq j \leq R}$ and $R \geq 2$; and for the $k_j$-qubit plaintext from each of the data providers, encoding this plaintext into a ciphertext $|\psi_j\rangle$;

S3. aggregating the number R of ciphertexts by a form of tensor product and generating an encoded state $$|\psi_{en}\rangle = \bigotimes_{j=1}^{R} |\psi_j\rangle$$

for computation; and

S4. preparing a model operation to conduct the computation, $U_{en}|\psi_{en}\rangle$, of an encoded operator $U_{en}$ and the encoded state $|\psi_{en}\rangle$ in a cloud.

In an embodiment of the present inventive concept, the cloud maintains single due to considering the parallel computation.

Figure 2A:
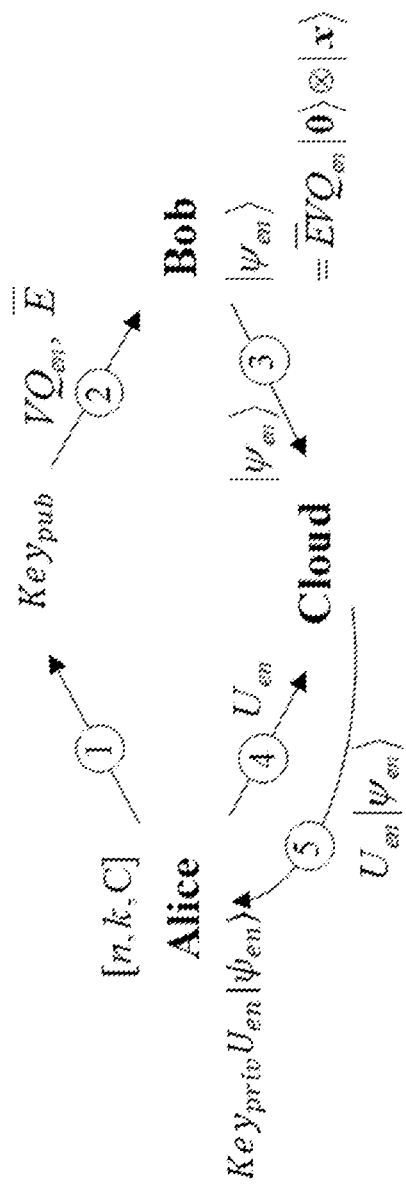
FIG. 2A is a schematic diagram of a single public key in the QAPHE system of an embodiment of the present inventive concept.

Please refer to FIG. 2A which is a schematic diagram of one public key in the QAPHE system of an embodiment of the present inventive concept. Specifically, the single public key may be defined as $\text{Key}_{pub} = (VQ_{en}, \text{Gen}_\epsilon)$; $U_{en}$ may be defined as $P\mathcal{AMB}Q_{en}^\dagger V^\dagger$; and the private key may be defined as $\text{Key}_{priv} = \mathcal{A}^+ P^+$.

Figure 2B:
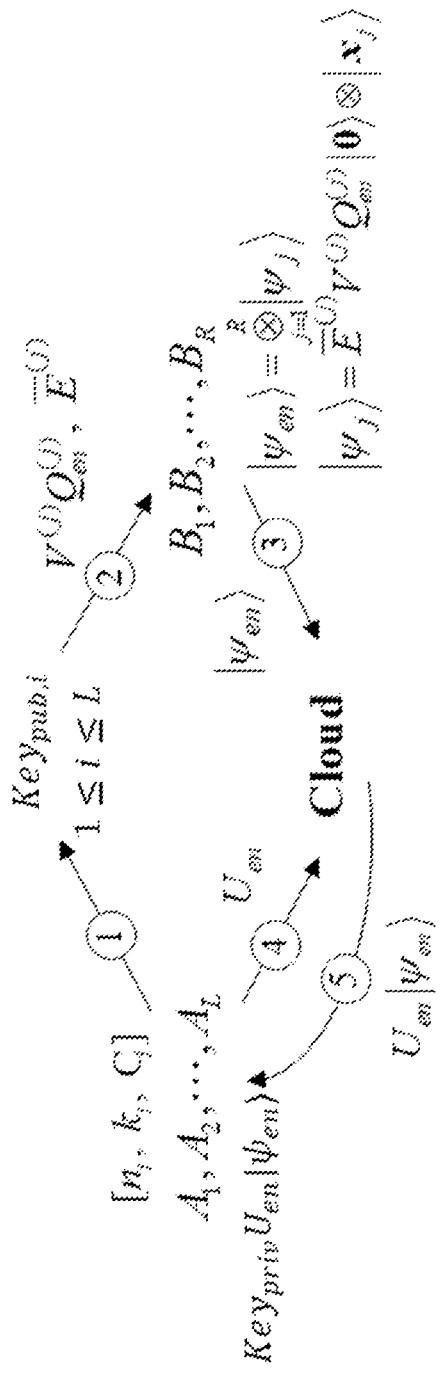
FIG. 2B is a schematic diagram of extending a single public key in the QAPHE system to multi-party system by the method of the present inventive concept.

Please refer to FIG. 2B which is a schematic diagram of extending a single public key in the QAPHE system to multi-party system by the method of the present inventive concept. In an embodiment of the present inventive concept, the multi-party system designed by the method executes its function by following a single public-key in QAPHE shown in FIG. 2A.

According to the present inventive concept, as shown in FIG. 2B, the model provider may be part of Alice and the data provider may be part of Bob.

In an embodiment of the present inventive concept, the step of S1 of the method may further comprise: choosing a partition $[n_i, k_i, C_i]$ by each of the model providers and one public-key $\text{Key}_{pub,i}$ and one private-key may be generated by each of the partition.

In an embodiment of the present inventive concept, the public-key may be composed of $n_i$-qubit modified encoding and a random error generator. The modified encoding may be represented as $V^{(j)}Q_{en}^{(j)}$ and the random error generator may be represented as $\text{Gen}_{\epsilon_i}$.

In an embodiment of the present inventive concept, the step of S2 of the method may further comprise: choosing a public-key $\text{Key}_{pub,j}$ by each of the data providers and each of the data providers may encode its own $k_j$-qubit plaintext into a ciphertext $|\psi_j\rangle$. In this embodiment, the ciphertext may be denoted as $|\psi_j\rangle = E^{(j)}V^{(j)}Q_{en}^{(j)}|0\rangle \otimes |x_j\rangle$.

According to the present inventive concept, as shown in FIG. 2B, the public key may be defined as $\text{Key}_{pub,i} = (V^{(j)}Q_{en}^{(j)}, \text{Gen}_{\epsilon_j})$; $U_{en}$ may be defined as $P\mathcal{AMB}Q_{en}^\dagger V^\dagger$; $Q_{en}^\dagger V^\dagger$ may be defined as $$\bigotimes_{j=1}^{R} (V^{(j)}Q_{en}^{(j)})^+;$$

$\mathcal{B}$ may be defined as $$\bigotimes_{j=1}^{R} \mathcal{B}^{(j)};$$

$\mathcal{M}$ may be defined as $$I_{2^{n-k}} \otimes \left( \bigotimes_{j=1}^{R} M_j \right);$$

and the private key may be defined as $\text{Key}_{priv} = \mathcal{A}^+ P^+$.

Figure 3A:
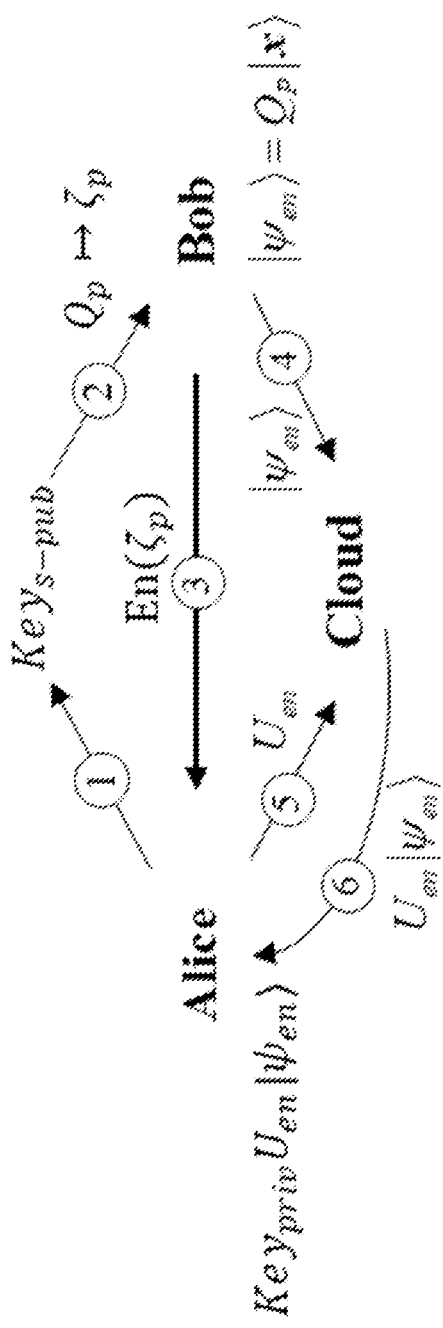
FIG. 3A is a schematic diagram of a single semi-public key in the QAPHE system of an embodiment of the present inventive concept.

Please refer to FIG. 3A which is a schematic diagram of a single semi-public key in the QAPHE system of an embodiment of the present inventive concept. Specifically, the single semi-public key may be defined as $Key_{s\text{-}pub}=Gen_Q$; $U_{en}$ may be defined as $P\mathcal{A}\mathcal{M}Q_p^\dagger$; and the private key may be defined as $Key_{priv}=\mathcal{A}^+P^+$.

Figure 3B:
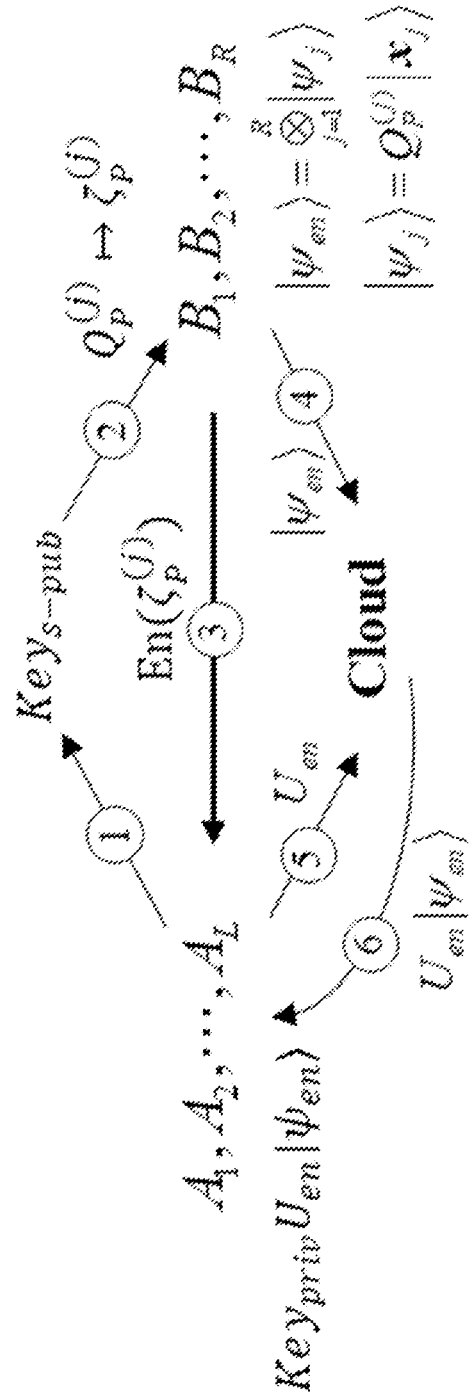
FIG. 3B is a schematic diagram of extending a single semi-public key in the QAPHE system to multi-party system by the method of the present inventive concept.

Please refer to FIG. 3B which is a schematic diagram of extending a single semi-public key in the QAPHE system to multi-party system by the method of the present inventive concept. according to an embodiment of the present inventive concept, the multi-party system designed by the method may execute its function by following a single semi-public-key in QAPHE shown in FIG. 3A.

According to the present inventive concept, as shown in FIG. 3B, the model provider may be part of Alice and the data provider may be part of Bob.

In an embodiment of the present inventive concept, the step of S1 of the method may further comprise: generating the semi-public-key $Key_{s\text{-}pub}$ by all the $A_{1\leq i\leq L}$ together.

In an embodiment of the present inventive concept, the semi-public-key may be composed of encoding generators. The encoding generators may be, for example, but not limited to k-qubit permutations.

In an embodiment of the present inventive concept, the step of S2 of the method may further comprise: choosing an encoding $Q_P^{(j)}$ by each of the data providers and each of the data providers encodes its own $k_j$-qubit plaintext into a ciphertext $|\psi_j\rangle$. In this embodiment, the ciphertext may be denoted as $|\psi_j\rangle=Q_p^{(j)}|x_j\rangle$.

In an embodiment of the present inventive concept, $$\sum_{j=1}^{R} k_j \leq k$$

in the step of S2.

In an embodiment of the present inventive concept, after the step of S3, the method may further comprise: sending encoded message $En(\zeta_P^{(j)})$ to $A_{\sigma(j)}$ by the data providers, wherein $\sigma(j)$ is a permutation.

According to the present inventive concept, as shown in FIG. 3B, the semi-public key maybe defined as $Key_{s\text{-}pub}=Gen_Q$; $U_{en}$ may be defined as $P\mathcal{A}\mathcal{M}Q^\dagger$; $Q^\dagger$ may be defined as $$\bigotimes_{j=1}^{R} (Q_P^{(j)})^+;$$

$\mathcal{M}$ may be defined as $$\bigotimes_{j=1}^{R} M_j;$$

and the private key may be defined as $Key_{priv}=\mathcal{A}^+P^+$.

According to the present inventive concept, a stabilizer code [n, k, C] with a stabilizer $C\subset su(2^n)$ is a quotient algebra partition $\{\mathcal{P}_Q(C)\}$. The quotient algebra partition is generated by the k-th maximal bi-subalgebra $C=\mathcal{B}^{[k]}$ of a Cartan subalgebra in $su(2^n)$. Specifically, there exists an isomorphism between the stabilizer C of [n, k, C] under the multiplication and the k-th maximal bi-subalgebra $\mathcal{B}^{[k]}$, i.e. $C=\mathcal{B}^{[k]}$. Therefore, the stabilizer code [n, k, C] inherits the partition structure from the QAP $\{\mathcal{P}_Q(C)\}$. There is a duality between the n-qubit encrypted state in the Hilbert space and the partition structure [n, k, C] have duality, which verifies the orthogonality connecting spinors and the codewords. A significant concept of the coset spinor is illustrated in the QAP structure, which implies the n-s condition for the error-correctability in a QAP.

In the partition structure [n, k, C], an error set $\varepsilon$ is correctable iff two arbitrary spinors of $\varepsilon$ are either in different blocks or in a same coset of a block within this partition structure. Besides, there are two implications of the concept of the coset spinor, the correction equivalence and the code degeneracy. The former one indicates that an error may be corrected by any operator in the same coset and the latter one expresses that a correctable error set allows spinors in a same coset, thereby obtaining two immediate results. One is that if there is no spinor of the error set, $\varepsilon$, in the subspace, $\Gamma_0$–C, [n, k, C] may detect the error set $\varepsilon$; and the other one is that if two errors exist in different cosets of the same block, then the two errors in [n, k, C] are not correctable. Consequently, the n-s condition for the error-correctability is affirmed.

The partition structure [n, k, C] is regarded as a quantum version of the classical Hamming code [n, k]. For every classical linear code, [n, k], there exists an only partition structure [n, k, C] determined by the code. For every partition structure [n, k, C], there exists an only symplectic linear code [2n, n+k] determined by the partition structure. In the partition structure [n, k, C], it requires an encoding built by the partition structure in the intrinsic coordinate to encode a k-qubit state into an n-qubit codeword.

In the partition structure [n, k, C], an encoding $Q_{en}\in SU(2^n)$ is an n-qubit spinor-to-spinor mapping transforming [n, k, C] into an intrinsic coordinate [n, k, Ĉ] generated by the intrinsic bi-subalgebra $\hat{C}=\{S_0^\zeta\otimes S_0^0:\zeta\in Z_2^{n-k}\}=Q_{en}^\dagger CQ_{en}$. In the intrinsic coordinate, the partition structure [n, k, Ĉ] is generated by the intrinsic bi-subalgebra $\hat{C}=\{S_0^\zeta\otimes S_0^0:\zeta\in Z_2^{n-k}\}$ that is the k-th maximal bi-subalgebra of the intrinsic Cartan subalgebra, $\mathfrak{C}_{[0]}$. In this partition structure, cosets of a block, $\widehat{\Gamma_{\mathcal{J}}}=\cup_{\mu\in Z_2^{2k}}\widehat{W_{\mathcal{J},\mu}}$, may be in the form of $\widehat{W_{\mathcal{J},\mu}}=\{S_{\mathcal{J}}^\zeta\otimes S_{\mathcal{K}}^\varsigma:\zeta\in Z_2^{n-k}\}$. In fact, an encoding $Q_{en}$ is a QAP-preserving spinor-to-spinor transformation mapping the partition structure [n, k, C] into the intrinsic [n, k, Ĉ]. In the partition structure [n, k, C], each fault tolerant encode, $U\in SU(2^n)$, requires meeting two standards, the eigen-invariance of $SU|\psi\rangle=U|\psi\rangle$ for each spinor $S\in C$ and each codeword, $|\psi\rangle$ and the error-correction against an error set $\varepsilon$ wherein $US_\beta|\psi\rangle=\Sigma_{\alpha\in Z_2^{n-k}-\{0\}}S_{\alpha,v}U|\psi\rangle$ in each coset $W_{\alpha,v}$ from each block, $\Gamma_\alpha$, $v\in Z_2^{2k}$ and $S_\beta\in\varepsilon$.

To correct an error set $\varepsilon\subset su(2^n)$ with an encoding $Q_{en}\in SU(2^n)$ in the partition structure [n, k, C], a fault tolerant encode of the k-qubit operator $M\in SU(2^k)$ may be denoted as the form, $U_{en}=Q_{en}\mathcal{A}\mathcal{T}\mathcal{M}\mathcal{B}Q_{en}^\dagger$, where $\mathcal{M}$ is a tensor product of M and the (n−k)-qubit identity $I_{2^{n-k}}$, which may be expressed as $\mathcal{M}=I_{2^{n-k}}\otimes M$, where $\mathcal{B}\in SU(2^n)$ is an operator of input coset associated with $\varepsilon$, $\mathcal{A}\in SU(2^n)$ is an operation of an output coset and $\mathcal{T}\in SU(2^n)$ is a transfer amplitude.

Quantum Circuit

Basic arithmetic, such as addition and multiplication, are illustrated in the following details of quantum circuit.

Every finite field $F_q=F_p^m$ is composed of elements $q=p^m$ for a prime number p and a positive integer m. The finite field is isomorphic to the quotient ring $Z_p[x]/f(x)$ of a polynomial ring $Z_p[x]$ and an irreducible polynomial function $f(x)$ of degree m.

Currently, major post-quantum cryptosystems, such as lattice-based code system, code-based system and multivariate-based system, are described by polynomial rings, rather than linear operations. The QAP structure may be composed of operates dual to states of a Hilbert space and allows applications of invertible linear transformations to these states inherently. This reveals essential differences between the solution of QAP-based HE and that based on a polynomial ring.

A quantum circuit exists to perform an addition $\Sigma_{i=1}^{N} m_i$ of a number N of l-bit message $m_i \in Z_2^l$. For the addition of two l-bit numbers, there is a more effective space-time implementation. For example, build a circuit with its linear size of O(l) in depth O(l) with O(l) ancilla qubit. Then, provide a circuit with its size of O(l) in logarithmic depth O(log l) with O(l/log l) ancilla qubit.

A quantum circuit exists to conduct a multiplication of two l-bit numbers, which permits the circuit design of multiplying two numbers with lower cost. For example, the Karatsuba-based multiplication requires a circuit size $O(l^{log_2 3})$ with its depth of O(l) without ancilla qubit. It is worth noting that every quantum gate applied to the addition or multiplication may be factorized into a composition of s-rotations.

Construction of Public-Key Scheme

The solution based on the QAPHE in a public key system is illustrated as follows.

The scheme of QAPHE is a dual process of QAP-based Fault Tolerance Quantum Computation, QAPFTQC. Assuming that a number of N of plaintexts, $\{x_i \in Z_2^{k_i}: 1 \leq i \leq N\}$, are protected and proceeded in a cloud server, first, choose a partition structure [n, k, C] generated by the k-th maximal bi-subalgebra C of a Cartan subalgebra in $su(2^n)$ for the above purpose. Then, construct a fault tolerant encode in [n, k, C] according to the methodology of QAPFTQC to attain full homomorphism.

Three stages of a QAPHE over [n, k, C] are illustrated as follows, i.e., the encryption, the computation, and the decryption. In the stage of encryption, a message is going to be encoded by the public key. Every partition structure [n, k, C] makes the encrypted public key, $Key_{pub}$, transform a k-qubit plaintext into an n-qubit ciphertext. In the partition structure [n, k, C]. The cost of encryption via a public key $Key_{pub}$ has an upper bound $O(n^2)$. The complexity of breaking the encryption via the public key $Key_{pub}$ has a lower bound $O(2^L)$ and an upper bound $O(2^{2n})$, where $\delta < L \leq n-k$, and $\delta$ is a postquantum security level.

A k-qubit encoded state $|x\rangle$ is transformed to an n-qubit codeword $|\psi_{en}\rangle$ by a given public key $Key_{pub}$ in a partition structure, where $|\psi_{en}\rangle = \bar{E}VQ_{en}|0\rangle \otimes |x\rangle$, $x \in Z_2^k$. The homomorphic computation of a k-qubit computation $M|x\rangle$ with an action M is realized by the fault tolerant encode $U_{en}$, where $M \in SU(2^k)$.

$$U_{en} = P\mathcal{A}\mathcal{M}\mathcal{B}Q_{en}^\dagger V^\dagger$$

$$=(PW_1P_1)(P_1^\dagger W_1^\dagger \mathcal{A}\mathcal{M}\mathcal{B}_1 W_1 P_1)(P_1^\dagger P_0)(P_0^\dagger W_1^\dagger \mathcal{B}_2 W_1 P_0)(P_0^\dagger W_2) \quad \text{Eq. 1}$$

In the above Eq. 1, $\mathcal{M} = I_{2^{n-k}} \otimes M$ and $I_{2^{n-k}}$ is an (n−k)-qubit identity. The correction operation $\mathcal{B} = \mathcal{B}_1 \mathcal{B}_2$ is factorized into two operators $\mathcal{B}_1$ and $\mathcal{B}_2 \in SU(2^n)$. $Q_{en}^\dagger V^\dagger$, a product of two operators, $W_1$ and $W_2 \in SU(2^n)$, may be written as $Q_{en}^\dagger V^\dagger = W_1 W_2$. The four operators $\mathcal{A}$, P, $P_1$ and $P_0 \in SU(2^n)$ are chosen to mix up the encoded and $PW_1P_1 = I_{2^n}$.

The practical application of $U_{en}$ is performed by the mixed composition of $2^{nd}$ line of Eq. 1. Specifically, each of $\mathcal{A}$, P, $P_1$ and $P_0$ is a composition of spinor-to-spinor s-rotations. Initially, the correction operator $\mathcal{B} = \mathcal{B}_1\mathcal{B}_2$ is written as a product of two unitary actions, $\mathcal{B}_1$ and $\mathcal{B}_2$. The operator $\mathcal{A}$ is chosen to mix up the composition $\mathcal{M}\mathcal{B}_1$. By factorizing $Q_{en}^\dagger V^\dagger$ into two actions, $W_1$ and $W_2$, let the operator $W_1$ be conducted as in the $2^{nd}$ line of Eq. 1 and $W_2$ stays. The two unitary actions $P_1$ and $P_0$ are inserted into the components of Eq. 1 to further mingle quantum gates. $P_0^\dagger W_1^\dagger \mathcal{B}_2 W_1 P_0$ is a modified action of $\mathcal{B}_2$ by absorbing the spinor-to-spinor operation $W_1 P_0$. Similarly, $P_1^\dagger W_1^\dagger \mathcal{A}\mathcal{M}\mathcal{B}_1 W_1 P_1$ is a modified action of $\mathcal{A}\mathcal{M}\mathcal{B}_1$ by absorbing the spinor-to-spinor operation $W_1 P_1$.

It is worthy to note that the computation of $U_{en}$ admits optimized design according to the problem-dependent operation M.

The cost of encoding and the security of encryption will be shown as follows. In a partition structure [n, k, C], the cost of a homomorphic computation given by a public key has the upper bound $O(n^p)$ for an integer $p \in N$ and the complexity of breaking the encryption via the public key $Key_{pub}$ has a lower bound $O(2^L)$.

The decryption of an encoded computation $U_{en}|\psi\rangle$ is accomplished by the operation of a private key. In the present inventive concept, a fault tolerant encode $U_{en} = P\mathcal{A}\mathcal{M}\mathcal{B}Q_{en}^\dagger V^\dagger \in SU(2^n)$ of a k-qubit arithmetic operation, $M \in SU(2^k)$, and an n-qubit state $|\psi_{en}\rangle = \bar{E}VQ_{en}|0\rangle \otimes |x\rangle$ encoded by the public key $Key_{pub}$ are given. $\mathcal{M} = I_{2^{n-k}} \otimes M$, the homomorphic computation $U_{en}|\psi_{ed}\rangle$ is decrypted to $M|x\rangle$ via the private key $Key_{priv} = \mathcal{A}^\dagger P^\dagger$.

Notice that the scheme of public-key can be extended to the model of multi-party homomorphic encryption by appropriately increasing the numbers of data receivers, date providers, public keys, and computation providers.

Construction of Semi-Public-Key Scheme

The semi-public key scheme based on a QAPHE is illustrated in detail, which is almost the same as the public-key scheme except that a small resource of communication are allowed in the semi-public key scheme between the data receiver and data owner.

A k-qubit plaintext is encoded into a k-qubit cyphertext via the semi-public key $Key_{s-pub}$. The cost of encoding a k-qubit state via the semi-public key $Key_{s-pub}$ is O(k). The encryption of a k-qubit plaintext through a semi-public key is more efficient than that of the same plaintext via a public key because it is not necessary to add a random error in the semi-public key scheme. The complexity of breaking the encryption by a semi-public key $Key_{s-pub}$ is identical to that of finding the encoding operation from the encrypted message of this operation. It allows a very high level of post-quantum security with the cryptosystem chosen for $Q_p$, the semi-public-key scheme is more secure than the public-key scheme.

An encoding operator $Q_p \in SU(2^k)$ generated by a k-qubit semi-public key $Key_{s-pub}$. The homomorphic computation of a k-qubit evaluation conducted by an arithmetic operation $M \in SU(2^k)$ is realized by a fault tolerant encode $U_{en}$.

$$U_{en} = P\mathcal{A}MQ_p^\dagger$$

$$=(P_0^\dagger W_1^\dagger \mathcal{A}MW_1P_0)(P_0^\dagger W_2) \quad \text{Eq. 2}$$

where $Q_p^\dagger$ is a product of two operators $W_1$ and $W_2$ ∈ W1 and W2∈$SU(2^k)$ and can be written as $Q_p^\dagger = W_1 W_2$. The three operators $\mathcal{A}$, P and $P_0 \in SU(2^n)$ are used to mix up the encode and $PW_1P_0 = I_{2^k}$. In the design of one-way function, the blindness of computation as of Eq. 2 is achievable, which is realized by merging and exchanging the given elementary gates.

The cost of a homomorphic computation by a semi-public key of k qubits has the upper bound $O(k^r)$ for an integer $t \in N$. An overhead of error-correction is no need in the semi-public-key scheme, which implies a computational cost lower than that in the public-key setting. The complexity of breaking a homomorphic computation by a semi-public key of k qubits is limited by $v(k)=(k^e/(r-d))^{r-d}+k^{2d}$, d, e and $r \in N$.

An encoded operation $U_{en}=P\mathcal{AMB}Q_p^\dagger \in SU(2^n)$ of a k-qubit arithmetic operation $M \in SU(2^k)$ and n k-qubit state $|\psi_{en}\rangle = Q_p|x\rangle$ encoded by a semi-public key $Key_{s-pub}$ are given. The homomorphic computation $U_{en}|\psi_{ed}\rangle$ is decrypted to $M|x\rangle$ by the private key $Key_{priv}=\mathcal{A}^\dagger P^\dagger$.

Similar to the public-key scheme, the concept of multi-party is applicable to the semi-public-key by increasing the numbers of data receivers, data providers, and computation providers, where a single semi-public key is adopted to produce multiple encoding operators for multiple users.

Example of the Public Key Encryption

The following illustrates that the feature "every partition structure [n, k, C] makes the encrypted public key, $Key_{pub}$, transform a k-qubit plaintext into an n-qubit ciphertext. In the partition structure [n, k, C]" of the present inventive concept is feasible. Various types of designs of public-key encryptions are permitted in the framework of QAP according to distinct difficult problems. In the following, two designs of encryptions are demonstrated.

In a partition structure [n, k, C] with an encoding $Q_{en}$, it allows a public key of encryption consisting of an operation $VQ_{en}$ and an error generator $Gen(\bar{\epsilon}; J)$ associated with a set $\bar{\epsilon}=\{\bar{E}_r=VE_rV^\dagger : r=1, 2, \ldots J\}$ of J<n-k errors, where $VQ_{en} \in SU(2^n)$ is a spinor-to-spinor transformation, spinors, V is a qubit permutation. The spinors $E_r \in su(2^n)$ are selected from independent blocks in the partition structure, respectively. $Gen(\bar{\epsilon}; J)$ can generate an error $\bar{E}=(\bar{E}_1)^{\epsilon_1}(\bar{E}_2)^{\epsilon_2}\ldots(\bar{E}_J)^{\epsilon_J}$ randomly from $\epsilon$ with $(\bar{E}_r)^0=I_{2^n}$ and $(\bar{E}_r)^1=\bar{E}_r$, $\epsilon_r \in Z_2$. The error $\bar{E}=(\bar{E}_1)^{\epsilon_1}(\bar{E}_2)^{\epsilon_2}\ldots(\bar{E}_J)^{\epsilon_J}$ may be a product by a certain number of spinors randomly chosen from $\bar{\epsilon}$. The public key can be written as Eq. 3 below.

$$Key_{pub}^{(1)}=(VQ_{en}, Gen(\bar{v}; J))$$ Eq. 3

Supposed that a number of l-qubit message $x_i \in Z_2^l$ is N, an $l_0$-qubit blank state $|x_0\rangle$ is expressed into a k-qubit basis state by $k=l_0+lN$, which is $|x\rangle = |x_1\rangle \otimes |x_2\rangle \ldots |x_N\rangle \otimes |x\rangle$. The form of the encoded state is $|\psi_{en}\rangle = \bar{E}VQ_{en}|0\rangle \otimes |x\rangle$ by writing the tensor product state $|0\rangle \otimes |x\rangle$ for the n-k qubit basic state $|0\rangle$.

The cost of encoding a plaintext x to the ciphertext $|\psi_{en}\rangle$ equals $|V||Q_{en}|+1$, where $|V| \sim O(nk)$ and $|Q_{en}| \sim O(n(n-k))$ are the numbers of 1- and 2-qubit s-rotations, respectively, in V and $Q_{en}$, and the number 1 is counted with the application of $\bar{E}$.

The complexity of breaking the encryption by the public key $Key_{pub}^{(1)}$ is the number of the steps to find the error $E=(\bar{E}_1)^{\epsilon_1}(\bar{E}_2)^{\epsilon_2}\ldots(\bar{E}_J)^{\epsilon_J}$ in the codeword $|\psi_{en}\rangle = \bar{E}VQ_{en}|0\rangle \otimes |x\rangle$, where $\epsilon_r \in Z_2$ and $1 \leq r \leq J$. A brute force attack leads to the upper bound $2^J$, which is the number of all possibilities of the J-bits $\epsilon_r$. On the other hand, the cost of finding $\bar{E}$ is equivalent to that of the problem of searching the representation of $\bar{E}$ in terms of spinors in a subset $S_G=\{\bar{E}_r: 1 \leq r \leq J\}$ of a finite abelian group $G=spanS_G$ with its size $2^J$. It takes a complexity is larger than or equals to $2^{J/2+1}$ and has a lower bound $O(2^{J/2})$.

In the known cryptosystem in code-based cryptography, the Muceliece cryptosystem, adopts a Goppa code [n, k] to corrects errors of weight $$t = \left\lceil \frac{n}{\log n} \right\rceil.$$

In this system, given a public key $\hat{G} \in Z_2^{k \times n}$, t, a message $x \in Z_2^k$ is encrypted to a cyphertext $c=x\hat{G}+e$ by multiplying $\hat{G}$ and adding a randomly chosen error e of weight t. Through a generic attack called information-set decoding, the complexity of restoring x from c is approximately $y^{n/\log n}$, $y=(1-k/n)^{1-k/n}$.

In a partition structure [n, k, C] with an encoding $Q_{en}$, a public key of encryption is allowed to be composed of the operation $VQ_{en}$ and an error generator $Gen(R_1, R_2; J)$, where $V \in SU(2^n)$ is s spinor-to-spinor transformation. $Gen(R_1, R_2; J)$ can generate an error $\bar{E}=S_\gamma^\xi \in su(2^n)$ randomly that is a solution of two sets of relations $R_{q=1,2}=\{\xi \cdot \zeta_{q,u_q}+\alpha_{q,u_q} \cdot \gamma=0: 1 \leq u_q \leq 2n-J_q\}$, $J_q < n-k$. Each set of $R_q$ is associated with a bi-subalgebra $\mathcal{B}_q \subset su(2^n)$ sizing $2^{J_q}$ and comprising spinors from different blocks in the partition structure, respectively. The intersection $\mathcal{B}=\mathcal{B}_1 \cap \mathcal{B}_2$ forms a bi-subalgebra of size $2^J$, $J < J_q$. The public key is written as Eq. 4.

$$Key_{pub}^{(2)}=(VQ_{en}, Gen(R_1, R_2; J))$$ Eq. 4

The cost of encoding a plaintext x to the ciphertext $|\psi_{en}\rangle$ equals $|V||Q_{en}|+1$, where $|V| \sim O(nk)$ and $|Q_{en}| \sim O(n(n-k))$ are the numbers of 1- and 2-qubit s-rotations, respectively, in V and $Q_{en}$, and the number 1 is counted with the application of $\bar{E}$. The complexity of the security of this encryption is the number of the steps to solve the group intersection problem, which has a lower bound $O(2^{(J)/2})$ and an upper bound $O(2^J)$.

The present inventive concept provides a method of designing of multi-party system in QAP-based homomorphic encryption. This method is able to improve the security of public-key/semi-public-key system; under proper conditions, the common designs of multi-party HE, such as threshold HE or multi-key HE, may be included to be immediately applied to actual problems.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A computer-implemented method of designing a multi-party system in quotient algebra partition-based homomorphic encryption (QAPHE), which is based on the framework of quotient algebra partition (QAP) and the computation of homomorphic encryption (HE), wherein the method comprises:

S1. increasing a single model provider A to multiple ones, wherein the number of the multiple model providers is L and let $A_{1 \leq i \leq L}$ and $L \geq 2$;

S2. increasing a single data provider B to multiple ones, wherein the number of the multiple data providers is R and let $B_{1 \leq j \leq R}$ and $R \geq 2$; and for a $k_j$-qubit plaintext from each of the data providers, encoding this plaintext into a ciphertext $|\psi_j\rangle$, wherein the the $k_j$-qubit indicates that this plaintext is encoded in a system of $k_j$ qubits;

S3. aggregating the number R of ciphertexts by a form of tensor product and generating an encoded state $$|\psi_{en}\rangle = \overset{j=1}{\underset{R}{\bigotimes}} |\psi_j\rangle$$

for computation; and

S4. preparing a model operation to conduct the computation, $U_{en}|\psi_{en}\rangle$, of an encoded operator $U_{en}$ and the encoded state $|\psi_{en}\rangle$ in a cloud.

2. The computer-implemented method of claim 1, wherein the multi-party system designed by the method executes its function by following a single public-key in QAPHE.

3. The computer-implemented claim 2, wherein the step of S1 of the method further comprises: choosing a partition $[n_i, k_i, C_i]$ by each of the model providers and one public-key $Key_{pub,i}$ and one private-key are generated by each of the partition, wherein $n_i$ denotes the number of qubits for the encoded state, $k_i$ denotes the number of qubits for the original state, and $C_i$ denotes the stabilizer of the partition $[n_i, k_i, C_i]$ for the i-th model provider.

4. The computer-implemented method of claim 3, wherein the public-key is composed of $n_i$-qubit modified encoding and a random error generator.

5. The computer-implemented method of claim 2, wherein the step of S2 of the method further comprises: choosing a public-key $Key_{pub,j}$ by each of the data providers and each of the data providers encodes its own $k_j$-qubit plaintext into a ciphertext $|\psi_j\rangle$.

6. The computer-implemented method of claim 1, wherein the multi-party system designed by the method executes its function by following a single semi-public-key in QAPHE.

7. The computer-implemented method of claim 6, wherein the step of S1 of the method further comprises: generating the semi-public-key $Key_{s\text{-}pub}$ by all the $A_{1 \leq i \leq L}$ together.

8. The computer-implemented method of claim 7, wherein the semi-public-key is composed of encoding generators.

9. The computer-implemented method of claim 6, wherein the step of S2 of the method further comprises: choosing an encoding $Q_P^{(j)}$ by each of the data providers and each of the data providers encodes its own $k_j$-qubit plaintext into a ciphertext $|\psi_j\rangle$.

10. The computer-implemented method of claim 6, wherein $$\sum_{j=1}^{R} k_j \leq k$$

in the step of S2.

11. The computer-implemented method of claim 6, wherein after the step of S3, the method further comprises: sending encoded message $En(\zeta_P^{(j)})$ to $A_{\sigma(j)}$ by the data providers, wherein $\sigma(j)$ is a permutation, wherein $\zeta_P^{(j)}$ denotes the encoded string of the j-th member.

12. The computer-implemented method of claim 1, wherein the cloud maintains a single cloud due to considering the parallel computation.

* * * * *